(12) United States Patent
McCloy

(10) Patent No.: US 10,180,088 B2
(45) Date of Patent: Jan. 15, 2019

(54) TAPERED ROLLER DRIVE FOR ELECTRIC VCT PHASER

(71) Applicant: BorgWarner Inc., Auburn Hills, MI (US)

(72) Inventor: Chad McCloy, Cortland, NY (US)

(73) Assignee: BorgWarner Inc., Auburn Hills, MI (US)

( * ) Notice: Subject to any disclaimer, the term of this patent is extended or adjusted under 35 U.S.C. 154(b) by 182 days.

(21) Appl. No.: 15/161,203

(22) Filed: May 21, 2016

(65) Prior Publication Data

US 2016/0348547 A1 Dec. 1, 2016

Related U.S. Application Data

(60) Provisional application No. 62/167,938, filed on May 29, 2015.

(51) Int. Cl.
*F01L 1/352* (2006.01)
*F16H 1/28* (2006.01)
*F16H 13/10* (2006.01)
*F16H 13/08* (2006.01)
*F16H 3/72* (2006.01)
(Continued)

(52) U.S. Cl.
CPC .......... *F01L 1/352* (2013.01); *F01L 2013/103* (2013.01); *F01L 2101/00* (2013.01); *F01L 2105/00* (2013.01); *F01L 2250/02* (2013.01); *F16H 1/2854* (2013.01); *F16H 3/72* (2013.01); *F16H 13/06* (2013.01); *F16H 13/08* (2013.01);
(Continued)

(58) Field of Classification Search
CPC ...... F16H 15/50; F16H 15/506; F16H 1/2854; F16H 3/72; F16H 13/06; F16H 13/08; F16H 13/10; F01L 1/352; F01L 2250/02; F01L 2013/103; F01L 2105/00
USPC ..................... 475/5, 190, 193, 194
See application file for complete search history.

(56) References Cited

U.S. PATENT DOCUMENTS 4,846,008 A * 7/1989 Kraus ..................... F16H 13/06
475/194
5,240,462 A 8/1993 Mochizuki et al.
(Continued)

FOREIGN PATENT DOCUMENTS

DE 102013020881 7/2014
EP 2415978 2/2012
(Continued)

OTHER PUBLICATIONS

Torotrak, http://www.rexresearch.com/torotrak/torotrak.htm, includes articles at least as early as 2007.
(Continued)

*Primary Examiner* — Roger L Pang
(74) *Attorney, Agent, or Firm* — Brown & Michaels, PC

(57) ABSTRACT

An electric phaser for dynamically adjusting a rotational relationship of a camshaft with respect to an engine crankshaft of an internal combustion engine includes an electric motor and a tapered roller drive. The tapered roller drive includes a sun, rollers, a carrier, at least one ring, and at least one load generator providing an axial load. The rollers are maintained in rolling engagement with the sun and the ring without the use of teeth. In some embodiments, the tapered roller drive is based on a fixed-sun design. In other embodiments, the tapered roller drive is based on a split ring design.

9 Claims, 5 Drawing Sheets

(51) Int. Cl.
*F16H 13/06* (2006.01)
*F16H 15/50* (2006.01)
*F01L 13/00* (2006.01)

(52) U.S. Cl.
CPC .............. *F16H 13/10* (2013.01); *F16H 15/50* (2013.01); *F16H 15/506* (2013.01)

(56) References Cited

U.S. PATENT DOCUMENTS

| | | | | |
|---|---|---|---|---|
| 5,584,774 A | * | 12/1996 | Fini, Jr. | ............ F16H 13/06 475/183 |
| 5,680,836 A | | 10/1997 | Peirik | |
| 5,680,837 A | * | 10/1997 | Pierik | ............ F01L 1/352 123/90.17 |
| 6,129,061 A | * | 10/2000 | Okuda | ............ F01L 1/352 123/90.17 |
| 6,302,073 B1 | | 10/2001 | Heer | |
| 8,192,323 B2 | | 6/2012 | Fox | |
| 8,752,515 B2 | | 6/2014 | Yamanaka et al. | |
| 8,868,316 B2 | | 10/2014 | Kokubo et al. | |
| 9,551,244 B2 | * | 1/2017 | Showalter | ............ F01L 1/34 |
| 2010/0064997 A1 | | 3/2010 | Ai | |
| 2011/0253085 A1 | | 10/2011 | Kokubo et al. | |
| 2013/0206087 A1 | | 8/2013 | Tadokoro et al. | |

FOREIGN PATENT DOCUMENTS

| | | | | |
|---|---|---|---|---|
| GB | 413802 A | * | 7/1934 | ............ F16H 13/06 |
| WO | 2010018821 | | 2/2010 | |

OTHER PUBLICATIONS

"Torotrak's new generation transmission is good gear", Quick, http://www.gizmag.com/torotrak-new-gen-transmissions/12692/, Sep. 3, 2009.

* cited by examiner

TAPERED ROLLER DRIVE FOR ELECTRIC VCT PHASER

BACKGROUND OF THE INVENTION

Field of the Invention

The invention pertains to the field of electric phasers (e-phasers). More particularly, the invention pertains to a tapered roller drive for an electric phaser.

Description of Related Art

In a closed loop power transmission system, variable cam timing (VCT) is the system that measures the angular displacement, or phase angle, of a camshaft, relative to the crankshaft to which it is operatively connected and then alters the phase angle to adjust various engine characteristics in response to demands for either an increase or a reduction in power. Typically, there is a feedback loop in which the desired values of such engine characteristics are measured against their existing values, and changes are effected inside the engine in response to any variances. To accomplish this, modern automobiles usually have one or more Electronic Control Units (ECU), which constantly analyze data from various parts of the engine or from other parts of the automobile, such as, for example, exhaust gas sensors, pressure sensors, and temperature sensors. A control signal is then emitted in response to such data. For example, with regard to VCT systems, as changes occur in engine or external conditions, the angular displacement between the camshaft and the crankshaft is adjusted accordingly.

A VCT system includes a cam phasing control device, sometimes referred to as a phaser, control valves, control valve actuators, and control circuitry. VCT is a process that refers to controlling and varying, when desirable, the angular relationship (the "phase") between the drive shaft and one or more camshafts, which control the engine's intake and exhaust valves. An electric phaser (e-phaser) is driven by an electric motor to control and vary the angular relationship between the drive shaft and one or more camshafts. In response to input signals, the electric phaser adjusts the camshaft to either advance or retard engine timing.

Torotrak Ltd. (Leyland, Lancashire, England) produces a continuously-variable transmission (CVT) with steel discs and rollers in place of conventional toothed gears. A lubricating and traction fluid ensures grip for the transfer of torque between the rollers and discs.

SUMMARY OF THE INVENTION

An electric phaser for dynamically adjusting a rotational relationship of a camshaft with respect to an engine crankshaft of an internal combustion engine includes an electric motor and a tapered roller drive. The tapered roller drive includes a sun, rollers, a carrier, at least one ring, and at least one load generator providing an axial load. The rollers are maintained in rolling engagement with the sun and the ring without the use of teeth. In some embodiments, the tapered roller drive is based on a fixed-sun design. In other embodiments, the tapered roller drive is based on a split ring design.

In some embodiments, the tapered roller drive includes a sun, rollers, a ring, a carrier, and a load generator. The sun is driven to rotate around a sun axis by the electric motor. The sun has a sun contact surface having a circular cross section without teeth and tapering with respect to the sun axis. The carrier is rotatable with the camshaft. The rollers are arranged around the sun. Each roller is rotatable on a roller axis at a roller angle with respect to the sun axis. Each roller has a roller contact surface without teeth in rolling engagement with the sun contact surface. The rollers are rotatably mounted on the carrier to rotate on the roller axes. The ring is driven by the crankshaft and has a ring contact surface without teeth in rolling engagement with the roller contact surfaces and defining a circular cross sectional interior space. The load generator applies an axial load to maintain the plurality of rollers in rolling engagement with the sun and the ring. The electric motor is driven at a motor speed to dynamically maintain or adjust the rotational relationship of the camshaft with respect to the crankshaft.

In other embodiments, the tapered roller drive includes a sun, rollers, a sprocket ring, a camshaft ring, a carrier, a first load generator, and a second load generator. The sun is driven to rotate around a sun axis by the electric motor. The sun has a sun contact surface having a circular cross section without teeth and tapering with respect to the sun axis. The carrier is rotatable around the sun axis. The rollers are arranged around the sun. Each roller is rotatable on a roller axis at a roller angle with respect to the sun axis. Each roller has a roller contact surface without teeth in rolling engagement with the sun contact surface. The rollers are rotatably mounted on the carrier to rotate on the roller axes. The sprocket ring is driven by the crankshaft. The sprocket ring has a sprocket ring contact surface without teeth in rolling engagement with the roller contact surfaces and defining a first circular cross sectional interior space. The camshaft ring is rotatable with the camshaft. The camshaft ring has a camshaft ring contact surface without teeth in rolling engagement with the roller contact surfaces and defining a second circular cross sectional interior space. The first load generator applies a first axial load to maintain the plurality of rollers in rolling engagement with the sun and the sprocket ring. The second load generator applies a second axial load to maintain the plurality of rollers in rolling engagement with the camshaft ring. The electric motor is driven at a motor speed to dynamically maintain or adjust the rotational relationship of the camshaft with respect to the crankshaft.

In some embodiments, a method of dynamically adjusting a rotational relationship of a camshaft with respect to a crankshaft of an internal combustion engine using an electric phaser includes applying an axial load to maintain the sun, the plurality of rollers, and the ring in rolling engagement and dynamically selecting a motor speed of the electric motor and adjusting the electric motor to the motor speed to dynamically adjust the rotational relationship of the camshaft with respect to the crankshaft.

DETAILED DESCRIPTION OF THE INVENTION

Figure 1:
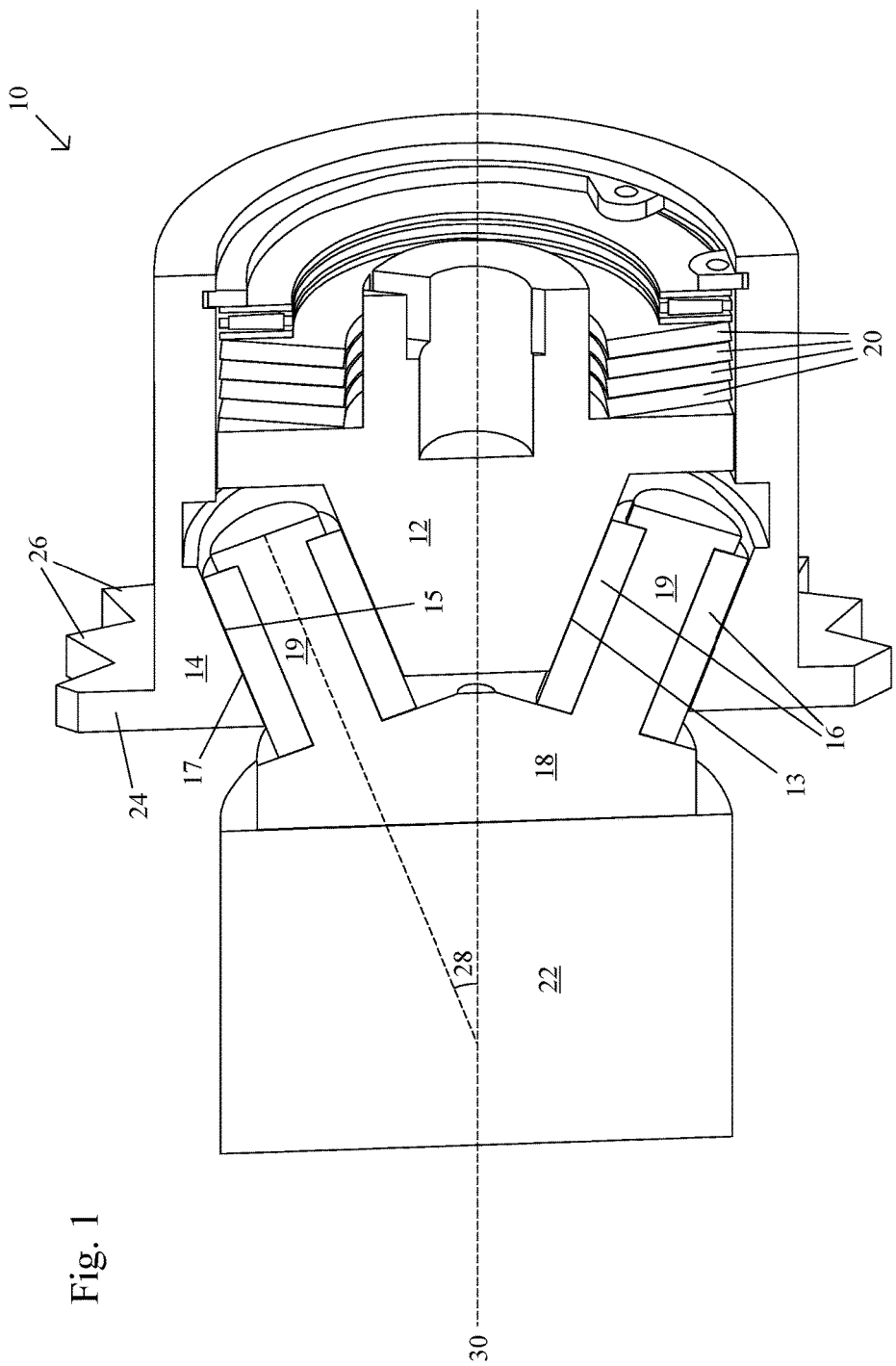
FIG. 1 shows a schematic of a cross sectional perspective view of a tapered roller drive for an electric phaser in a fixed sun embodiment of the present invention.

A tapered roller drive without teeth acts as a planetary drive for an electric phaser (e-phaser) to avoid the backlash that would be present between the planet gear teeth and ring gear teeth and planet gear teeth and sun gear teeth in a planetary drive of an electric phaser. This also eliminates the non-backlash-related gear noise generated by a typical planetary drive gear set and greatly reduces noise-vibration-harshness (NVH). The use of rollers instead of gears requires an axial load great enough to prevent complete slip through friction.

Although backlash and noise-vibration-harshness (NVH) can be significantly reduced in a conventional planetary drive with gear teeth by using highly precise ground gears, this generally makes manufacture of the gears prohibitively expensive.

Instead of teeth, the planetary type drive preferably includes smooth rollers and races similar to a tapered roller, an angular contact, or an axial spherical roller bearing to avoid the backlash and NVH. The rollers and races are less expensive to produce than highly precise ground sun, planet, and ring gears. One or more load generators generate a high axial load to create enough force between components such that the unit acts as a friction drive.

In a fixed sun embodiment, the inner race serves as the sun, the rollers serve as the planets, and the outer race acts as the ring gear.

In a split ring gear embodiment, the inner race serves as the sun, the rollers serve as the planets, and the outer races act as the sprocket gear and the camshaft gear.

The load generator may be any device capable of generating a load and may be based on a mechanically-generated force, an electromagnetically-generated force, or a hydraulically-generated force.

The rollers continuously slip to a certain degree, so the camshaft position is maintained by closed loop control. The amount of slip is controlled and compensated for by the closed loop control, with some slip being acceptable. In some embodiments, drag may exceed that of a gear type planetary drive due to the high loads required to generate enough friction.

The contact surfaces on the rollers, sun, and ring are preferably smooth surfaces. In some embodiments, the rollers are made of bearing quality steel. The bearing quality steel is preferably a high-carbon steel. A friction oil on the contact surfaces of the rollers, sun, and ring may be used to reduce slip between the contact surfaces.

In some embodiments, the electric phaser is designed based on a fixed-sun system. In a conventional fixed sun planetary drive system with teeth, the sun remains fixed to maintain the current phasing. In fixed-sun embodiments without teeth, a certain degree of slippage may be desired or necessary between the sun and the rollers and between the rollers and the ring. In these embodiments, the electric motor only rotates the sun at a nominal speed fast enough to make up for slippage between the rollers and the ring in order to maintain the current phasing between the camshaft and the crankshaft. Adjusting the electric motor speed from this nominal speed adjusts the phase of the camshaft with respect to the crankshaft. To move the phaser in the advancing direction, the speed of the electric motor is increased beyond the nominal speed required to maintain the phasing between the camshaft and the crankshaft. To move the phaser in the retarding direction, the speed of the electric motor is decreased below the nominal speed required to maintain the phasing between the camshaft and crankshaft, and, depending on the rate of phase change desired, the direction of rotation of the electric motor may be reversed. The electric motor is preferably a brushed DC motor.

In other embodiments, the electric phaser is designed based on a split ring gear system. Although in a split ring planetary drive system with teeth, the electric motor rotates the sun at the same speed as the camshaft ring to maintain a constant phase position between the crankshaft and the camshaft, a certain degree of slippage may be desired or necessary between the sun and the rollers and between the rollers and the rings in a planetary drive system without teeth. In these embodiments, the electric motor rotates the sun slightly faster than the speed of the sprocket ring to make up for slippage in order to maintain a constant phase position between the crankshaft and the camshaft. Under these conditions, the planetary assembly rotates as a unit with no relative movement between the sun and the rollers or between the rollers and the rings, except for any slippage, which minimizes frictional losses. Adjusting the electric motor speed with respect to the sprocket ring/camshaft ring/camshaft adjusts the phase of the camshaft with respect to the crankshaft.

In some embodiments, the split ring gear system is designed to have a positive ratio between the sprocket ring and the camshaft ring, where the contact surface of the sprocket ring has a greater diameter than the diameter contact surface of the camshaft ring. When the electric motor rotates the sun at a speed faster than the speed to maintain the current phasing, the phaser is moving in the advancing direction. When the electric motor rotates the sun at a speed slower than the speed to maintain the current phasing, the phaser is moving in the retarding direction. The electric motor is preferably a brushless DC motor.

In other embodiments, the split ring gear system is designed to have a negative ratio between the sprocket ring and the camshaft ring, where the contact surface of the camshaft ring has a greater diameter than the contact surface of the sprocket ring. When the electric motor rotates the sun at a speed faster than the speed to maintain the current phasing, the phaser is moving in the retarding direction. When the electric motor rotates the sun at a speed slower than the speed to maintain the current phasing, the phaser is moving in the advancing direction. The electric motor is preferably a brushless DC motor.

In order to transfer any torque, the roller angle must be between 0 (rollers parallel to the sun axis) and 90 (rollers perpendicular to the sun axis) degrees. The roller angle is preferably selected to balance the following factors: Decreasing the roller angle lowers the theoretical force required to generate a normal force between the rollers and the sun and ring or rings ($F_\theta = F_0 \sin(\theta)$, where $\theta$ is the roller angle, $F_0$ is the force at 90 degrees, and $F_\theta$ is the force when $\theta$ is the roller angle). Decreasing the roller angle also decreases the losses in the axial bearing that the load generator acts against, decreases the mass needed because less carcass strength is needed to support the loads, reduces part stress, and makes the device more susceptible to angle tolerances in the parts. If the roller angle is too low, however, the axial force may become low enough that axial friction in the components starts to play into reducing the normal forces. The lower practical limit of the roller angle may also be affected by the necessary diameter change between the camshaft ring and the sprocket ring in split ring embodiments. The optimum roller angle may also be somewhat driven by the phaser package.

Referring to FIG. 1, a tapered roller drive 10 based on a fixed-sun system includes a sun 12, a ring 14, a plurality of rollers 16, and a carrier 18. The sun 12 connects to an electric motor (46, see FIG. 2). The electric motor 46 drives the sun 12 to rotate. A load generator 20 provides an axial load on the sun 12 toward the rollers 16 and simultaneously on the ring 14 toward the rollers 16. In some embodiments, the load generator 20 is a plurality of disc springs. In some embodiments, the load generator 20 is at least one compression coil spring.

The sun 12 drives the rollers 16 by friction without the use of teeth. The contacting surface 13 of the sun 12 is in rolling engagement with the contacting surfaces 17 of the rollers 16. The contacting surfaces 17 of the rollers 16 are also in rolling engagement with the contacting surface 15 of the ring 14. The rollers 16 are mounted on carrier extensions 19 of the carrier 18, which rotates with a camshaft 22. The crankshaft (40, see FIG. 2) drives the ring 14 by way of a sprocket 24 with sprocket teeth 26 coupled by an endless loop power transmission chain (42, see FIG. 2) to a drive sprocket (44, see FIG. 2) on the crankshaft 40. Although the tapered roller drive 10 of FIG. 1 may be, and is shown as, a two-roller drive or a four-roller drive, a three-roller drive is preferred for load balancing and simplicity purposes. Regardless of the number of roller drives, the roller drives are preferably equally spaced from each other around the sun 12.

The rollers 16 are arranged at a roller angle 28 with respect to the central axis 30, which is the axis of rotation of the camshaft 22, the sun 12, and the electric motor 46. The roller angle 28 is preferably selected to optimize transfer of torque between the sun 12 and the rollers 16 and between the rollers 16 and the ring 14.

Although the rollers 16 in FIG. 1 appear to have a cylindrical outer surface for contacting the surfaces of the sun 12 and the ring 14, the outer surface of the rollers 16 may either be cylindrical or slightly tapered, preferably from the proximal end to the distal end with respect to the carrier 18, to provide predetermined areas of contact between the contacting surfaces 17 of the rollers 16 and the contacting surfaces of the sun 12 and ring 14. Although the contacting surfaces of the sun 12 and the ring 14 in FIG. 1 appear to be at the same angle 28 as the rollers 16 and the contacting surfaces 17 of the rollers 16, the contacting surfaces of the sun 12 and the ring 14 may be at the same angle 28, at a slightly different angle, or slightly contoured to provide predetermined areas of contact between the contacting surfaces 17 of the rollers 16 and the contacting surfaces 13, 15 of the sun 12 and ring 14, respectively.

Figure 2:
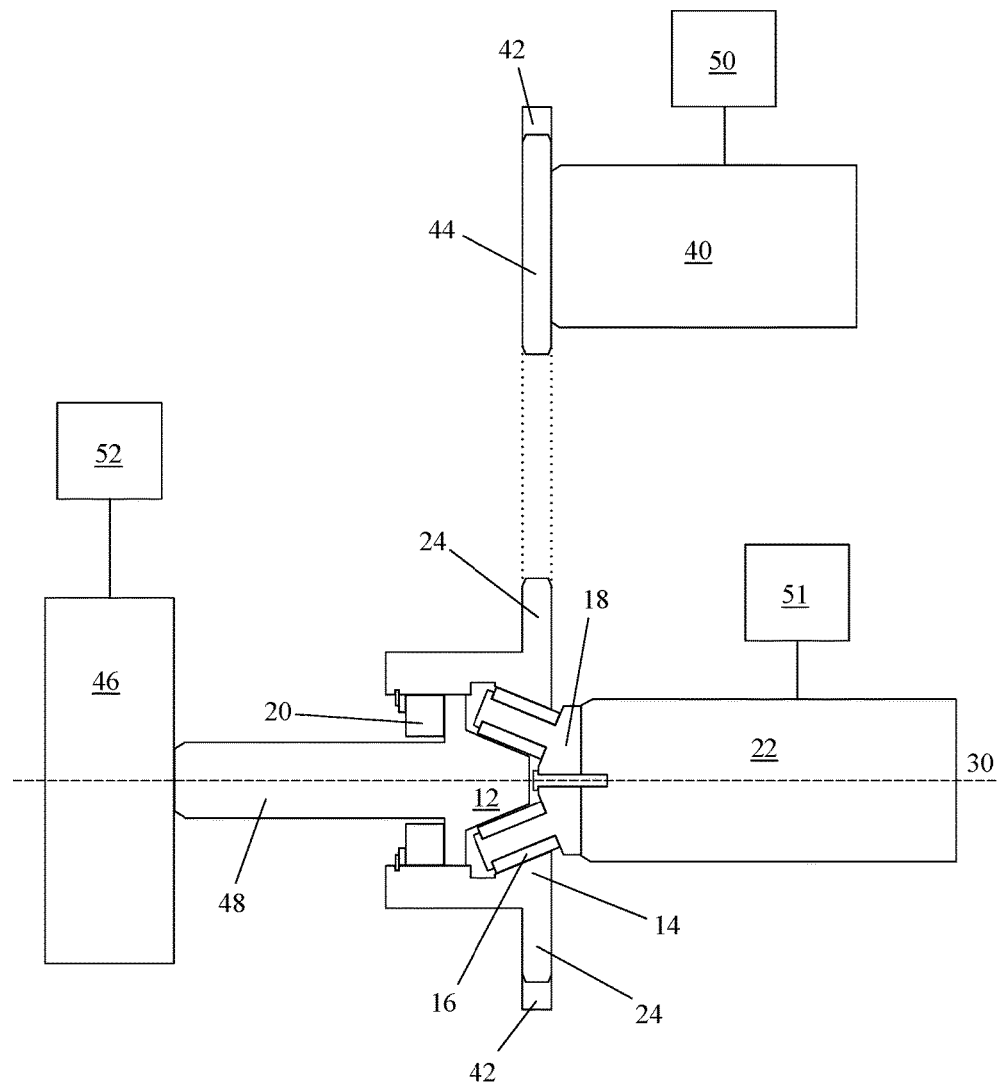
FIG. 2 shows a schematic of a cross sectional view of an electric phaser with the tapered roller drive of FIG. 1.

Referring to FIG. 2, an engine crankshaft 40 with a drive sprocket 44 is rotationally engaged through a timing chain 42 to the ring 14 through the sprocket 24, and the engine camshaft 22 is rotationally engaged to the carrier 18. An electric motor 46 is rotationally engaged with the sun 12 by way of an output shaft 48.

When the sun 12 is rotated by the electric motor 46 around its axis 30 at a nominal speed to make up for slippage between the rollers 16 and the ring 14, a constant cam phase position is maintained.

When the sun 12 is driven at a different speed from the nominal speed or in the other direction by the electric motor 46, the sun 12 causes the camshaft 22 to shift with respect to the crankshaft 40, thereby adjusting the phasing.

The cam phaser is preferably used to dynamically adjust the rotational relationship of the camshaft 22 to the engine crankshaft 40 to improve the fuel efficiency of the engine. Sensors 50, 51, one 50 on the crankshaft 40 and one 51 on the camshaft 22 are preferably used as feedback to a motor controller 52 to measure the current position of the camshaft 22 relative to the crankshaft 40 to determine what adjustment, if any, is desired at any point in time to achieve optimal engine efficiency.

Figure 3:
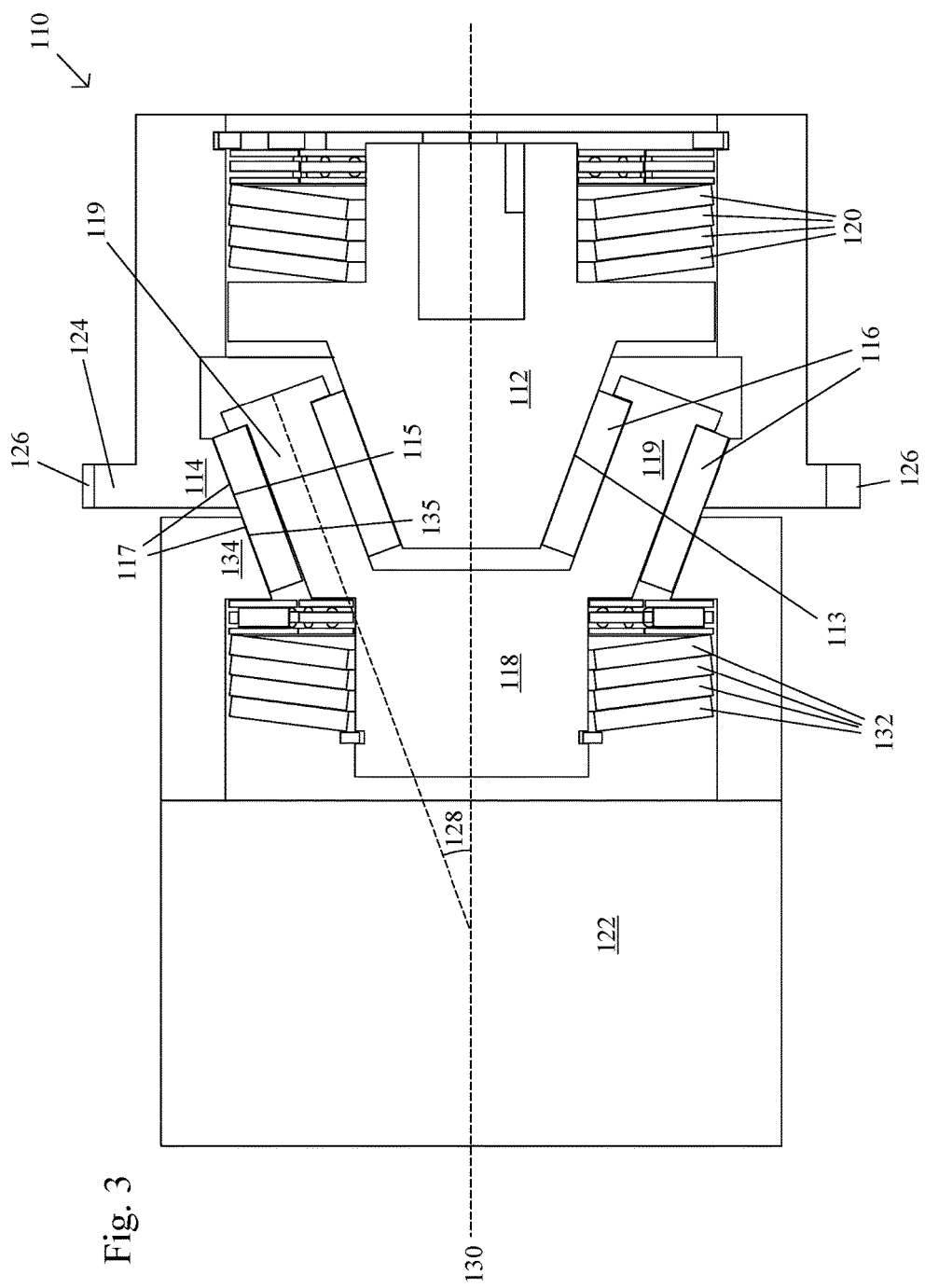
FIG. 3 shows a schematic of a cross sectional view of a tapered roller drive for an electric phaser in a split ring embodiment of the present invention.

Referring to FIG. 3, a tapered roller drive 110 based on a split-ring system includes a sun 112, a sprocket ring 114, a plurality of rollers 116, a carrier 118, and a camshaft ring 134. The sun 112 connects to an electric motor (146, see FIG. 4). The electric motor 146 drives the sun 112 to rotate. A load generator 120 provides an axial load on the sun 112 toward the rollers 116 and simultaneously on the sprocket ring 114 toward the rollers 116. A second load generator 132 provides an axial load on the camshaft ring 134 toward the rollers 116. In some embodiments, each load generator 120, 134 is a plurality of disc springs. In some embodiments, each load generator 120, 134 is at least one compression coil spring.

The sun 112 drives the rollers 116 by friction without the use of teeth. The contacting surface 113 of the sun 112 is in rolling engagement with the contacting surfaces 117 of the rollers 116. The contacting surfaces 117 of the rollers 116 are also in rolling engagement with the contacting surface 115 of the sprocket ring 114 and the contacting surface 135 of the camshaft ring 134. The rollers 116 are mounted on carrier extensions 119 of the carrier 118, which rotates with a camshaft 122. The crankshaft (140, see FIG. 4) drives the sprocket ring 114 by way of an outer sprocket 124 with sprocket teeth 126 coupled by an endless loop power transmission chain (142, see FIG. 4) to a drive sprocket (144, see FIG. 4) on the crankshaft 140. Although the tapered roller drive 110 of FIG. 3 may be, and is shown as, a two-roller drive or a four-roller drive, a three-roller drive is preferred for load balancing and simplicity purposes. Regardless of the number of roller drives, the roller drives are preferably equally spaced from each other around the sun 112.

The rollers 116 are arranged at a roller angle 128 with respect to the central axis 130, which is the axis of rotation of the camshaft 122, the sun 112, and the electric motor 146. The roller angle 128 is preferably selected to optimize transfer of torque between the sun 112 and the rollers 116 and between the rollers 116 and the sprocket ring 114 and camshaft ring 134.

Although the rollers 116 in FIG. 3 appear to have a cylindrical outer surface 117 for contacting the surfaces of the sun 112, the sprocket ring 114, and the camshaft ring 134, the outer surface 117 of the rollers 116 may either be cylindrical or slightly tapered, preferably from the ends toward the center of the rollers 116, to provide predetermined areas of contact between the contacting surfaces 117 of the rollers 116 and the contacting surfaces of the sun 112, the sprocket ring 114, and the camshaft ring 134. Although the contacting surfaces of the sun 112, the sprocket ring 114, and the camshaft ring 134 in FIG. 3 appear to be at the same angle 128 as the rollers 116 and the contacting surfaces 117 of the rollers 116, the contacting surfaces of the sun 112, the sprocket ring 114, and the camshaft ring 134 may be at the same angle 128, at a slightly different angle, or slightly contoured to provide predetermined areas of contact between the contacting surfaces 117 of the rollers 116 and the contacting surfaces of the sun 112, the sprocket ring 114, and the camshaft ring 134. Alternatively, there may be a discontinuity in the contacting surface 117 of the rollers 116 between where the rollers 116 contact the contacting surface 115 of the sprocket ring 114 and the contacting surface 135 of the camshaft ring 134. In such embodiments, the sun 112 may only contact the portion of the roller 116 that contacts the sprocket ring 114.

Figure 4:
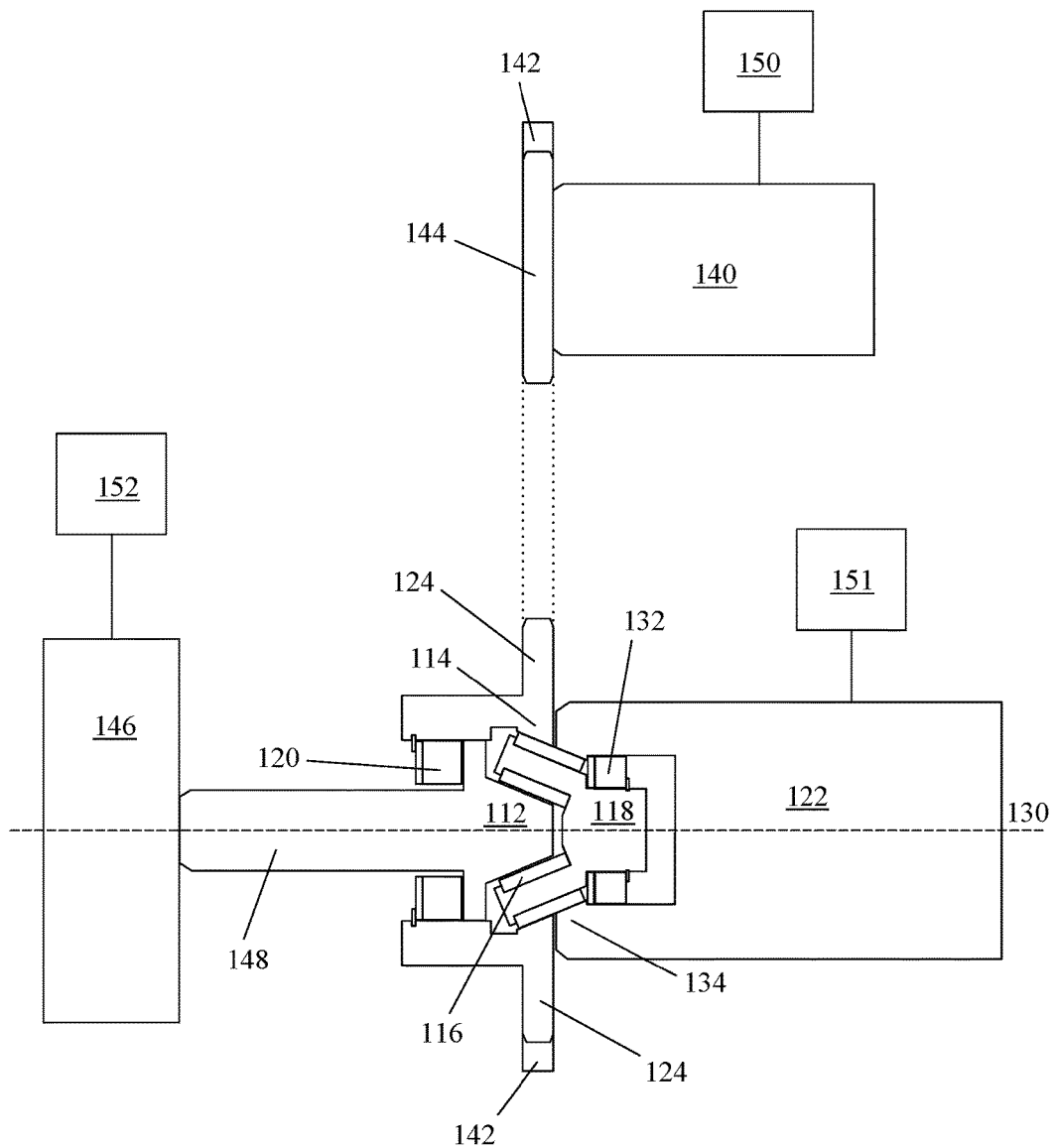
FIG. 4 shows a schematic of a cross sectional view of an electric phaser with the tapered roller drive of FIG. 3.

Referring to FIG. 4, an engine crankshaft 140 with a drive sprocket 144 is rotationally engaged through a timing chain 142 to the sprocket ring 114 through the sprocket 124, and the engine camshaft 122 is rotationally engaged to the camshaft ring 134. An electric motor 146 is rotationally engaged with the sun 112 by way of an output shaft 148.

When the sun 112 is rotated by the electric motor 146 around its axis 130 at the speed of the camshaft 122 plus a nominal speed to make up for slippage between the rollers 116 and the camshaft ring 134, a constant cam phase position is maintained.

When the sun 112 is driven at a different speed from the speed of the camshaft 122 plus the nominal speed by the electric motor 146, the sun 112 causes the camshaft 122 to shift with respect to the crankshaft 140 as a result of the difference in diameter between the contacting surface of the camshaft ring 134 and the contacting surface of the sprocket ring 114, thereby adjusting the phasing.

The greater the roller angle 128, the less of a speed change in the speed of the sun 112 is required to adjust the phasing between the crankshaft 140 and the camshaft 122 by a given amount.

The cam phaser is preferably used to dynamically adjust the rotational relationship of the camshaft 122 to the engine crankshaft 140 to improve the fuel efficiency of the engine. Sensors 150, 151, one 150 on the crankshaft 140 and one 151 on the camshaft 122 are preferably used as feedback to a motor controller 152 to measure the current position of the camshaft 122 relative to the crankshaft 140 to determine what adjustment, if any, is desired at any point in time to achieve optimal engine efficiency.

Figure 5:
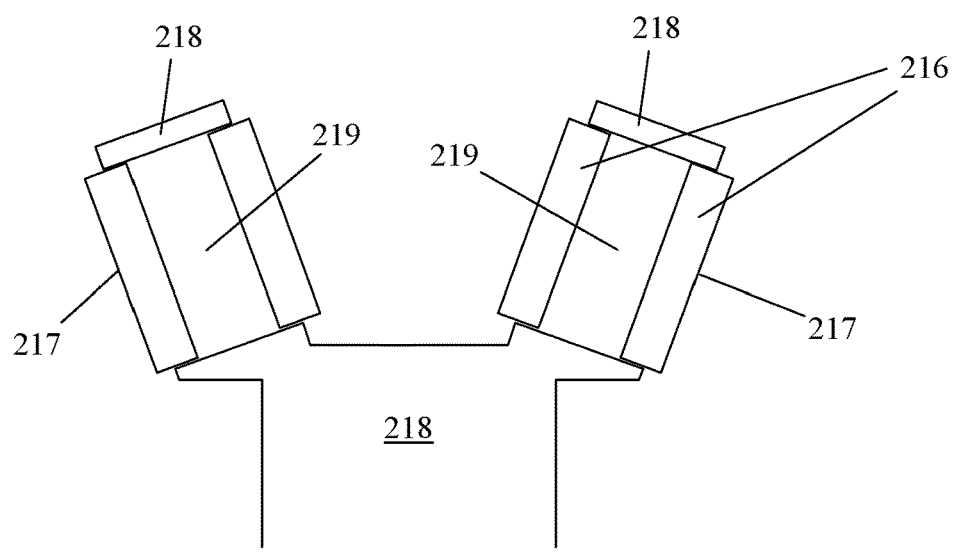
FIG. 5 shows a cross sectional view of a carrier and roller design in another embodiment of the present invention.
Figure 6:
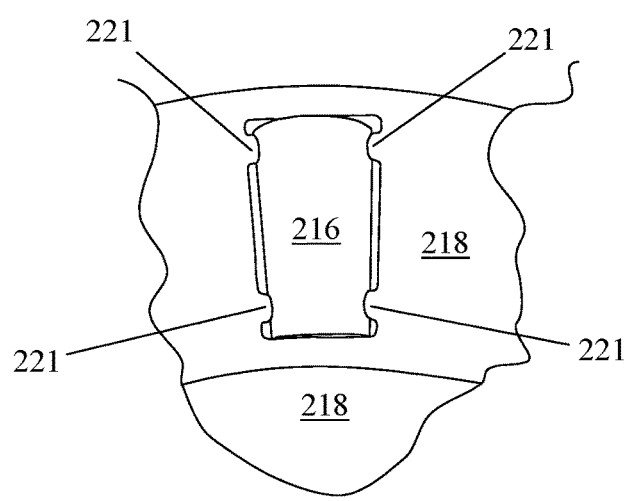
FIG. 6 shows a partial front view of the carrier and roller design of FIG. 5.

In the alternate design shown in FIG. 5 and FIG. 6, the carrier 218 captures the rollers 216 in cavities 219 similar to tapered roller bearings rather than supporting the rollers 216 on cylindrical carrier extensions. This design may be used either in fixed sun embodiments or split ring embodiments. The rollers 216 extend through openings in the carrier 218 so that the roller contact surfaces 217 are able to simultaneously contact both the sun contact surface and the ring contact surfaces. Tabs 221 on the carrier 218 cover part of the opening to help maintain the rollers 216 in the cavities 219 while reducing the contact between the carrier 218 and the roller contact surfaces 217.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An electric phaser for dynamically adjusting a rotational relationship of a camshaft with respect to a crankshaft of an internal combustion engine, the electric phaser comprising:
    an electric motor; and
    a split ring tapered roller drive comprising:
        a sun driven to rotate around a sun axis by the electric motor, the sun having a sun contact surface having a circular cross section without teeth and tapering with respect to the sun axis;
        a carrier rotatable around the sun axis;
        a plurality of rollers arranged around the sun, each roller rotatable on a roller axis at a roller angle with respect to the sun axis, each roller having a roller contact surface without teeth in rolling engagement with the sun contact surface, wherein the rollers are rotatably mounted on the carrier to rotate on the roller axes;
        a sprocket ring driven by the crankshaft, the sprocket ring having a sprocket ring contact surface without teeth in rolling engagement with the roller contact surfaces and defining a first circular cross sectional interior space;
        a camshaft ring rotatable with the camshaft, the camshaft ring having a camshaft ring contact surface without teeth in rolling engagement with the roller contact surfaces and defining a second circular cross sectional interior space; and
        a load generator applying an axial load to maintain the plurality of rollers in rolling engagement with the sun and the ring;
    wherein the electric motor is driven at a motor speed to dynamically maintain or adjust the rotational relationship of the camshaft with respect to the crankshaft.

2. The electric phaser of claim 1, wherein the plurality of rollers comprises three rollers.

3. The electric phaser of claim 1, wherein the load generator is a plurality of disc springs.

4. The electric phaser of claim 1 further comprising a friction oil on the roller contact surfaces reducing slip between the roller contact surfaces and the sun contact surface, the sprocket ring contact surface, and the camshaft ring contact surface.

5. The electric phaser of claim 1, wherein the roller angle is selected such that transfer of torque between the sun and the rollers, between the rollers and the sprocket ring, and between the rollers and the camshaft ring is optimized.

6. The electric phaser of claim 1, wherein when a diameter of the sprocket ring contact surface is greater than a diameter of the camshaft ring contact surface:
    rotation of the sun by the electric motor at a nominal speed nominally faster than a speed of rotation of the camshaft to compensate only for slippage between the rollers and the camshaft ring maintains a current phasing between the camshaft and the crankshaft;
    rotation of the sun by the electric motor at an advancing speed greater than the nominal speed adjusts the phaser in an advancing direction; and
    rotation of the sun by the electric motor at a retarding speed less than or in the opposite direction to the nominal speed adjusts the phaser in a retarding direction.

7. The electric phaser of claim 1, wherein when a diameter of the camshaft ring contact surface is greater than a diameter of the sprocket ring contact surface:
    rotation of the sun by the electric motor at a nominal speed nominally faster than a speed of rotation of the camshaft to compensate only for slippage between the rollers and the camshaft ring maintains a current phasing between the camshaft and the crankshaft;
    rotation of the sun by the electric motor at a retarding speed greater than the nominal speed adjusts the phaser in a retarding direction; and
    rotation of the sun by the electric motor at an advancing speed less than or in the opposite direction to the nominal speed adjusts the phaser in an advancing direction.

8. A method of dynamically adjusting a rotational relationship of a camshaft with respect to a crankshaft of an internal combustion engine using an electric phaser comprising an electric motor; and a split ring tapered roller drive comprising a sun driven to rotate around a sun axis by the electric motor, the sun having a sun contact surface having a circular cross section without teeth and tapering with respect to the sun axis; a carrier rotatable around the sun axis; a plurality of rollers arranged around the sun, each roller rotatable on a roller axis at a roller angle with respect to the sun axis, each roller having a roller contact surface without teeth in rolling engagement with the sun contact surface, wherein the rollers are rotatably mounted on the carrier to rotate on the roller axes; a sprocket ring driven by the crankshaft, the sprocket ring having a sprocket ring contact surface without teeth in rolling engagement with the roller contact surfaces and defining a first circular cross sectional interior space and a camshaft ring rotatable with the camshaft, the camshaft ring having a camshaft ring contact surface without teeth in rolling engagement with the roller contact surfaces and defining a second circular cross sectional interior space, the method comprising:

applying an axial load to maintain the sun, the plurality of rollers, and the ring in rolling engagement; and dynamically selecting a motor speed of the electric motor and adjusting the electric motor to the motor speed to dynamically adjust the rotational relationship of the camshaft with respect to the crankshaft.

9. The method of claim 8, wherein:

a diameter of the sprocket ring contact surface is greater than a diameter of the camshaft ring contact surface;

rotation of the sun by the electric motor at a nominal speed nominally faster than a speed of rotation of the camshaft to compensate only for slippage between the rollers and the camshaft ring maintains a current phasing between the camshaft and the crankshaft;

rotation of the sun by the electric motor at an advancing speed greater than the nominal speed adjusts the phaser in an advancing direction; and rotation of the sun by the electric motor at a retarding speed less than or in the opposite direction to the nominal speed adjusts the phaser in a retarding direction.

\* \* \* \* \*